(12) United States Patent
Uyeno et al.

(10) Patent No.: US 11,835,709 B2
(45) Date of Patent: Dec. 5, 2023

(54) OPTICAL SENSOR WITH MICRO-ELECTRO-MECHANICAL SYSTEM (MEMS) MICRO-MIRROR ARRAY (MMA) STEERING OF THE OPTICAL TRANSMIT BEAM

(71) Applicant: Raytheon Company, Waltham, MA (US)

(72) Inventors: Gerald P. Uyeno, Tucson, AZ (US);
Benn H. Gleason, Tucson, AZ (US);
Sean D. Keller, Tucson, AZ (US);
Mark K. Lange, Tucson, AZ (US);
Eric Rogala, Tucson, AZ (US);
Vanessa Reyna, Tucson, AZ (US);
Craig O. Shott, Tucson, AZ (US); Jon E. Leigh, Tucson, AZ (US); Garret A. Odom, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 481 days.

(21) Appl. No.: 17/171,577

(22) Filed: Feb. 9, 2021

(65) Prior Publication Data
US 2022/0252865 A1    Aug. 11, 2022

(51) Int. Cl.
*G02B 26/08* (2006.01)
*G01S 7/481* (2006.01)
(Continued)

(52) U.S. Cl.
CPC ........ *G02B 26/0833* (2013.01); *G01S 7/4811* (2013.01); *G01S 7/4817* (2013.01); *G01S 17/931* (2020.01); *G01S 17/933* (2013.01)

(58) Field of Classification Search
CPC ........ G01S 7/4817; G01S 17/66; G01S 17/88; G01S 7/4815; G01S 17/89; F41G 7/2246; F41G 7/008; F41G 7/2253; F41G 7/2293
See application file for complete search history.

(56) References Cited

U.S. PATENT DOCUMENTS

| 3,899,145 A | 8/1975 | Stephenson |
|---|---|---|
| 5,404,375 A | 4/1995 | Kroeger et al. |

(Continued)

FOREIGN PATENT DOCUMENTS

| DE | 102011104023.8 B4 | 7/2019 |
|---|---|---|
| EP | 2667142 A1 | 11/2013 |

(Continued)

OTHER PUBLICATIONS

"U.S. Appl. No. 17/007,917, Notice of Allowance dated Jan. 10, 2022", 14 pgs.

(Continued)

*Primary Examiner* — Elmito Breval
(74) *Attorney, Agent, or Firm* — Schwegman Lundberg & Woessner, P.A.

(57) ABSTRACT

A beam steering architecture for an optical sensor is based upon a pair of Micro-Electro-Mechanical System (MEMS) Micro-Mirror Arrays (MMAs) and a fold mirror. The MEMS MMAs scan both primary and secondary FOR providing considerable flexibility to scan a scene to provide not only active imaging (to supplement passive imaging) but also simultaneously allowing for other optical functions such as establishing a communications link, providing an optical transmit beam for another detection platform or determining a range to target. A special class of MEMS MMAs that provides a "piston" capability in which the individual mirrors may translate enables a suite of optical functions to "shape" the optical transmit beam.

22 Claims, 12 Drawing Sheets

(51) Int. Cl.
*G01S 17/931* (2020.01)
*G01S 17/933* (2020.01)

(56) References Cited

U.S. PATENT DOCUMENTS

| | | | |
|---|---|---|---|
| 5,854,702 A | 12/1998 | Ishikawa et al. | |
| 6,021,975 A | 2/2000 | Livingston | |
| 6,181,450 B1 | 1/2001 | Dishman et al. | |
| 6,268,944 B1 | 7/2001 | Szapiel | |
| 6,271,953 B1 | 8/2001 | Dishman et al. | |
| 6,327,063 B1 | 12/2001 | Rockwell | |
| 6,359,681 B1 | 3/2002 | Housand et al. | |
| 6,567,574 B1 | 5/2003 | Ma et al. | |
| 6,792,028 B2 | 9/2004 | Cook et al. | |
| 7,304,296 B2 | 12/2007 | Mills et al. | |
| 7,593,641 B2 | 9/2009 | Tegge, Jr. | |
| 7,626,152 B2 | 12/2009 | King et al. | |
| 7,660,235 B2 | 2/2010 | Alicherry et al. | |
| 7,667,190 B2 | 2/2010 | Mills et al. | |
| 7,969,558 B2 | 6/2011 | Hall | |
| 8,164,037 B2 | 4/2012 | Jenkins et al. | |
| 8,203,703 B1* | 6/2012 | Kane | G02B 26/105 356/141.5 |
| 8,301,027 B2 | 10/2012 | Shaw et al. | |
| 8,305,578 B1 | 11/2012 | Mudge et al. | |
| 8,311,372 B2 | 11/2012 | Anderson et al. | |
| 8,368,889 B2 | 2/2013 | Schwiegerling et al. | |
| 8,380,025 B2 | 2/2013 | Anderson et al. | |
| 8,463,080 B1 | 6/2013 | Anderson et al. | |
| 8,767,190 B2 | 7/2014 | Hall | |
| 8,823,848 B2 | 9/2014 | Chipman et al. | |
| 8,983,293 B2 | 3/2015 | Frankel et al. | |
| 9,473,768 B2 | 10/2016 | Uyeno et al. | |
| 9,477,135 B1 | 10/2016 | Uyeno et al. | |
| 9,632,166 B2 | 4/2017 | Trail et al. | |
| 9,857,226 B2 | 1/2018 | LeMaster et al. | |
| 9,904,081 B2 | 2/2018 | Uyeno et al. | |
| 9,927,515 B2 | 3/2018 | Keller et al. | |
| 10,148,056 B2 | 12/2018 | Uyeno et al. | |
| 10,209,439 B2 | 2/2019 | Keller et al. | |
| 10,243,654 B1 | 3/2019 | Uyeno et al. | |
| 10,267,915 B2 | 4/2019 | Uyeno et al. | |
| 10,381,701 B2 | 8/2019 | Motoi | |
| 10,444,492 B2 | 10/2019 | Hopkins et al. | |
| 10,718,491 B1 | 7/2020 | Raring et al. | |
| 10,969,598 B2 | 4/2021 | Fest et al. | |
| 10,998,965 B2 | 5/2021 | Tong et al. | |
| 11,042,025 B2 | 6/2021 | Uyeno et al. | |
| 11,333,879 B2 | 5/2022 | Uyeno et al. | |
| 2002/0141689 A1 | 10/2002 | Qian et al. | |
| 2002/0196506 A1 | 12/2002 | Graves et al. | |
| 2003/0062468 A1 | 4/2003 | Byren et al. | |
| 2003/0081321 A1 | 5/2003 | Moon et al. | |
| 2003/0179444 A1 | 9/2003 | Cook | |
| 2003/0185488 A1 | 10/2003 | Blumenthal | |
| 2004/0021852 A1 | 2/2004 | DeFlumere | |
| 2004/0072540 A1 | 4/2004 | Wilson et al. | |
| 2004/0081466 A1 | 4/2004 | Walther et al. | |
| 2004/0141752 A1 | 7/2004 | Shelton et al. | |
| 2004/0258415 A1 | 12/2004 | Boone et al. | |
| 2005/0031255 A1 | 2/2005 | Schroeder et al. | |
| 2005/0100339 A1 | 5/2005 | Tegge | |
| 2005/0122566 A1 | 6/2005 | Cicchiello | |
| 2005/0288031 A1 | 12/2005 | Davis et al. | |
| 2006/0038103 A1 | 2/2006 | Helmbrecht | |
| 2007/0031157 A1 | 2/2007 | Yamada et al. | |
| 2007/0036480 A1 | 2/2007 | Wu | |
| 2008/0050064 A1 | 2/2008 | Sakai et al. | |
| 2008/0118247 A1 | 5/2008 | Drago et al. | |
| 2010/0149533 A1 | 6/2010 | Fest | |
| 2010/0166430 A1 | 7/2010 | Alten | |
| 2012/0002973 A1 | 1/2012 | Bruzzi et al. | |
| 2012/0008133 A1 | 1/2012 | Silny et al. | |
| 2012/0114337 A1 | 5/2012 | Aoki | |
| 2012/0155885 A1 | 6/2012 | Hannah et al. | |
| 2012/0168605 A1 | 7/2012 | Milanovic | |
| 2013/0271818 A1 | 10/2013 | Bastien et al. | |
| 2014/0063299 A1 | 3/2014 | Fest et al. | |
| 2014/0253999 A1 | 9/2014 | Hegg | |
| 2015/0043599 A1 | 2/2015 | Yanagida et al. | |
| 2015/0099476 A1 | 4/2015 | Beals | |
| 2015/0172218 A1 | 6/2015 | Beshai | |
| 2015/0311981 A1 | 10/2015 | Inagaki et al. | |
| 2015/0378242 A1 | 12/2015 | Auxier et al. | |
| 2016/0003677 A1 | 1/2016 | Pezzaniti et al. | |
| 2016/0043800 A1 | 2/2016 | Kingsbury et al. | |
| 2016/0223327 A1 | 8/2016 | Norman et al. | |
| 2016/0234703 A1 | 8/2016 | Aldana et al. | |
| 2016/0294472 A1 | 10/2016 | Palmer et al. | |
| 2017/0214839 A1* | 7/2017 | Keller | G02B 3/0056 |
| 2017/0293137 A1 | 10/2017 | Zhao et al. | |
| 2018/0124342 A1* | 5/2018 | Uyeno | H04N 3/10 |
| 2018/0231715 A1 | 8/2018 | Bishop et al. | |
| 2019/0066320 A1 | 2/2019 | Uyeno et al. | |
| 2019/0154921 A1 | 5/2019 | Xing et al. | |
| 2020/0244359 A1 | 7/2020 | Csonka et al. | |
| 2021/0088776 A1 | 3/2021 | Uyeno et al. | |
| 2021/0091854 A1 | 3/2021 | Uyeno et al. | |
| 2021/0092260 A1 | 3/2021 | Uyeno et al. | |
| 2022/0107490 A1 | 4/2022 | Uyeno et al. | |
| 2022/0120861 A1 | 4/2022 | Keller et al. | |
| 2022/0121035 A1 | 4/2022 | Rogala et al. | |

FOREIGN PATENT DOCUMENTS

| | | |
|---|---|---|
| EP | 2533003 B1 | 8/2018 |
| WO | WO-2014200581 A2 | 12/2014 |
| WO | WO-2022115164 A2 | 6/2022 |
| WO | WO-2022115164 A3 | 6/2022 |

OTHER PUBLICATIONS

"U.S. Appl. No. 17/007,917, Supplemental Notice of Allowability dated Apr. 19, 2022", 2 pgs.

"U.S. Appl. No. 17/065,177, Non Final Office Action dated Mar. 23, 2023", 9 pgs.

"U.S. Appl. No. 17/071,767, Notice of Allowance dated Feb. 15, 2023", 12 pgs.

"U.S. Appl. No. 17/071,767, Response filed Oct. 7, 2022 to Restriction Requirement dated Sep. 29, 2022", 8 pgs.

"U.S. Appl. No. 17/071,767, Restriction Requirement dated Sep. 29, 2022", 6 pgs.

"International Application Serial No. PCT/US2021/053725, International Preliminary Report on Patentability dated Apr. 20, 2023", 10 pgs.

"International Application Serial No. PCT/US2021/053725, International Search Report dated Aug. 16, 2022", 4 pgs.

"International Application Serial No. PCT/US2021/053725, Written Opinion dated Aug. 16, 2022", 8 pgs.

"MEMS Mirror Array—Beam Steering Mode", [Online]. Retrieved from the Internet: <www.youtube.com/watch?v=wHIUU3kKtzM>, (Aug. 10, 2017), 2 pgs.

Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.

Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.

Tsou, et al., "Extended-image spatial tracking technique for deep-space optical downlinks", Proc. SPIE 3762, Adaptive Optics Systems and Technology, (Sep. 27, 1999), 101-109.

Tuantranont, et al., "Optical beam steering using MEMS-controllable microlens array", Sensors and Actuators A: Physical vol. 91, Issue 3, (Jul. 15, 2001), 363-372.

Siegman, A. E., "Unstable optical resonators for laser applications", Proceedings of the IEEE, vol. 53, Issue 3, (Mar. 1965), 277-287.

U.S. Appl. No. 17/007,917, filed Aug. 31, 2020, Electronically Steered Inter-Satellite Optical Communication System With Micro-Electromechanical (MEM) Micromirror Array (MMA).

(56) References Cited

OTHER PUBLICATIONS

U.S. Appl. No. 17/065,177, filed Oct. 7, 2020, Optical Sensor With Tx/Rx Aperture Sharing Element (ASE) to Block Detection of the Received Active Signal.
U.S. Appl. No. 17/071,729, filed Oct. 15, 2020, Optical Sensor With Tx/Rx Aperture Sharing Element (ASE) for Processing Passive and Active Signals.
U.S. Appl. No. 17/071,767, filed Oct. 15, 2020, Optical Sensor With Ring-Shaped Tx/Rx Aperture Sharing Element (ASE).
"U.S. Appl. No. 16/871,602, Non Final Office Action dated Nov. 9, 2020", 18 pgs.
"U.S. Appl. No. 16/871,602, Notice of Allowance dated Feb. 24, 2021", 5 pgs.
"U.S. Appl. No. 16/871,602, Response filed Feb. 8, 2021 to Non Final Office Action dated Nov. 9, 2020", 12 pgs.
"U.S. Appl. No. 17/007,917, Non Final Office Action dated Aug. 3, 2021", 35 pgs.
"U.S. Appl. No. 17/007,917, Response filed Dec. 1, 2021 to Non Final Office Action dated Aug. 3, 2021", 16 pgs.
"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.
"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.
"Mirrorcle Technologies MEMS Mirrors—Technical Overview", Mirrorcle Technologies, Inc., (2018), 7 pgs.
Ayral, J.-L., et al., "Phase-conjugate Nd:YAG laser with internal acousto-optic beam steering", Optics Letters, vol. 16, No. 16, (Aug. 15, 1991), 1225-1227.
Chiu, Yi, et al., "Shape-Optimized Electrooptic Beam Scanners: Analysis, Design, and Simulation", Journal of Lightwave Technology, vol. 17, No. 1, (Jan. 1999), 108-114.
Kim, et al., "Demonstration of large-angle nonmechanical laser beam steering based on LC polymer polarization grating", Proc.. of SPIE vol. 8052 80520T, (May 13, 2011).
Kim, Jihwan, et al., "Wide-angle, nonmechanical beam steering using thin liquid crystal polarization gratings", Proc. of SPIE, vol. 7093, (2008), 12 pgs.
King, D F, et al., "3rd-Generation 1280 x 720 FPA development status at Raytheon Vision Systems", Proc. of SPIE vol. 6206 62060W-1, (2006), 16 pgs.
Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.
Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.
Wang, Jinxue, et al., "Doppler Winds Lidar Technology Development and Demonstration", AIAA-2005-6772, Space 2005, Long Beach, California, Aug. 30-1, 2005, 11 pgs.
Yamamoto, R., et al., "Evolution of a Solid State Laser", Proc. SPIE 6552, Laser Source Technology for Defense and Security III, 655205, (May 10, 2007), 11 pgs.

\* cited by examiner

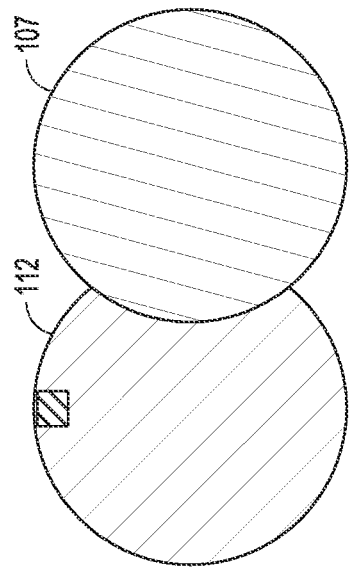
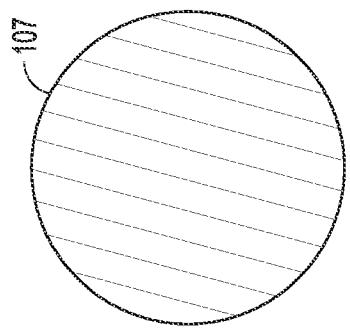
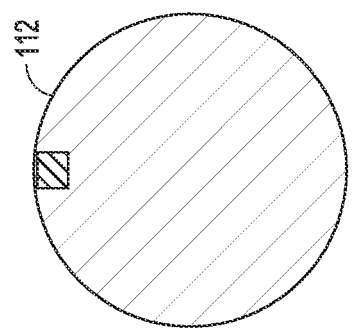
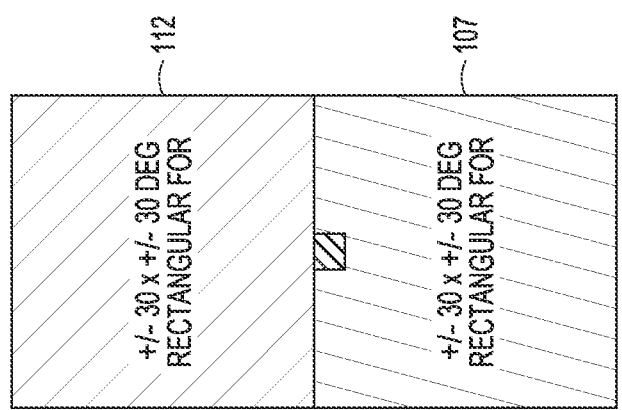

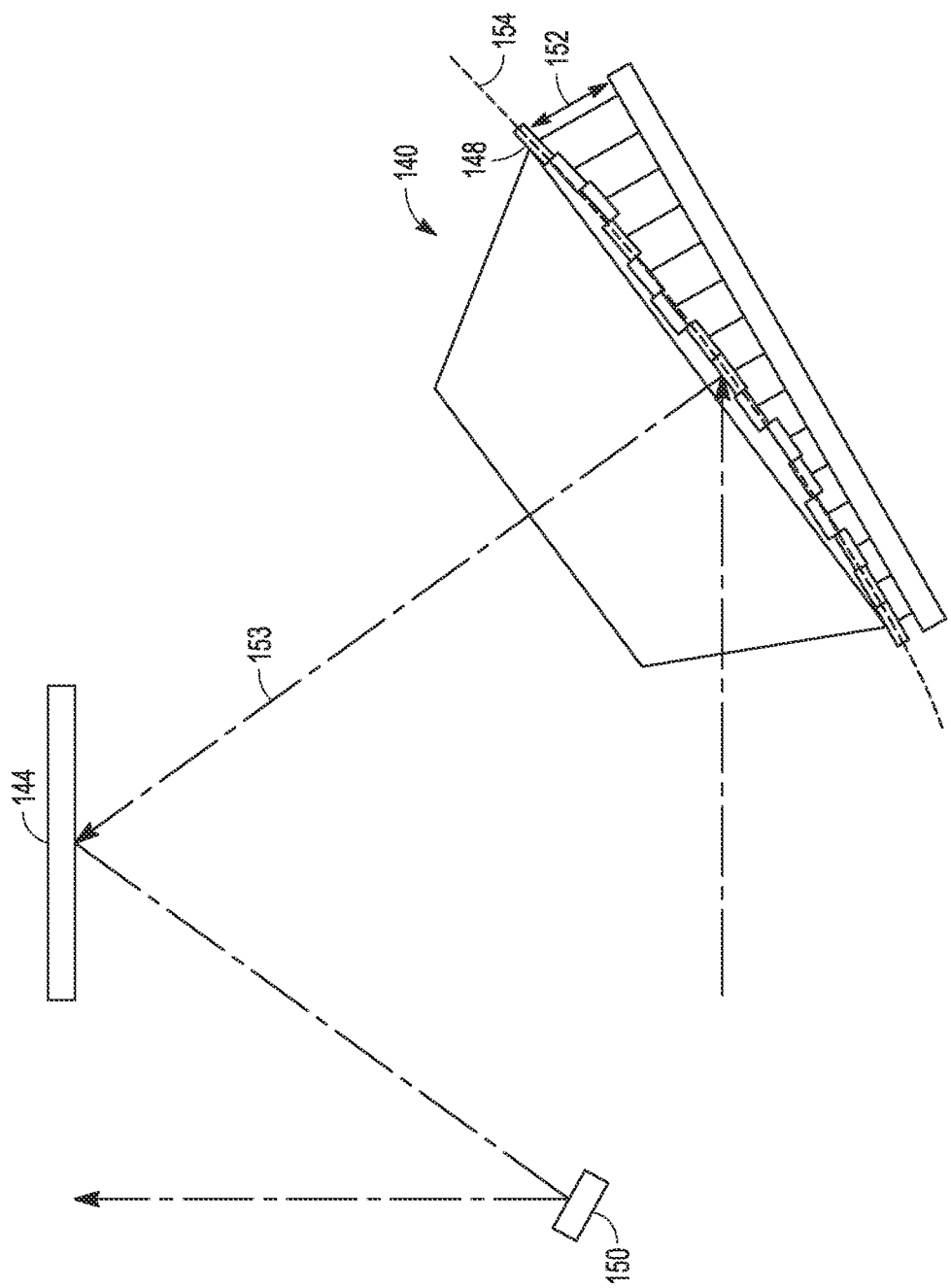

| NUMBER OF MIRRORS | | FOR | | | | | MULTIPLE | | PISTON COMPENSATION |
|---|---|---|---|---|---|---|---|---|---|
| MMA1 | MMA2 | PRIMARY | | | SECONDARY | | WAVELENGTHS | BEAMS | |
| | | AZ | EL | | AZ | EL | | | |
| 1 | 1 | +/-30 | 0 TO 60 | | +/-30 | 60 TO 120 | Y (MULTI BEAM) | N | N |
| 1 | M | +/-30 | 0 TO 60 | | +/-60 | 60 TO 120 | Y (MULTI BEAM) | N | N |
| N | 1 | +/-30 | 0 TO 60 | | +/-30 | 60 TO 120 | Y | Y | Y |
| N | M | +/-30 | 0 TO 60 | | +/-60 | 60 TO 120 | Y | Y | Y |

FIG. 12

OPTICAL SENSOR WITH MICRO-ELECTRO-MECHANICAL SYSTEM (MEMS) MICRO-MIRROR ARRAY (MMA) STEERING OF THE OPTICAL TRANSMIT BEAM

BACKGROUND OF THE INVENTION

Field of the Invention

This invention relates to optical sensors and particularly to gimbaled or staring optical sensors that steer an optical transmit beam at a given wavelength over a field-of-regard (FOR) and receive optical emissions, passive or active, over a range of wavelengths.

Description of the Related Art

Optical sensors are commonly used as part of guided munitions and possibly autonomous vehicles. Passive systems use light emissions e.g. IR or visible from a target to detect and track the target. Active systems use an on-board source to emit light e.g. IR or visible, or RF as an optical transmit beam that is reflected from the target to detect and track the target. The active return may be used for ranging, simple guidance commands to a target centroid or active imaging. The on-board source may also be used for other applications. The passive and active systems are often combined.

A typical gimbaled optical sensor includes inner (nod) and outer (roll) gimbals positioned behind a protective dome or window that rotate about orthogonal axes to point an optical axis in a three-dimensional space over a field-of-regard (FOR). An off-gimbal detector is responsive to a band of wavelengths e.g. Visible or IR (SWIR, MWIR, NIR, LWIR, etc.) A telescope mounted on the inner gimbal along the optical axis collects light from the target to form an intermediate image. Gimbal optics propagate the light over the outer (roll) and inner (nod) gimbals along an optical path while preserving image quality. Off-gimbal focus optics relay the intermediate image to the detector. In some applications, an Aperture Sharing Element (ASE) is positioned in a receive aperture to separate the incident light into different wavelength bands e.g. Visible and IR and direct the light to different detectors. In a passive system, the pointer detects only emissions from the target within the field-of-view (FOV) of the telescope (gimbaled to scan over the FOR). In a passive system, pointing control of a transmitter is performed "open loop", based only on the detection of the passive emissions of the target.

To add active capabilities, an off-gimbal optical source e.g., a laser, emits light in a narrowband around a specified wavelength. This optical transmit beam is routed along an optical path (free-space or fiber) along the gimbal axes to a transmit telescope where it is transmitted toward the target. The transmit telescope may be mounted off-axis from the receive telescope or a common Tx/Rx telescope may be used for both transmit (Tx) and receive (Rx). In the latter case, an ASE may be positioned in a common aperture to couple the transmit beam from the optical source to the common Tx/Rx telescope and to couple the returned transmit beam and the passive emissions from the target to the detector. An additional ASE may be positioned in the receive path to separate the incident light into different wavelength bands and direct the light to different detectors. Processing of the active return again may provide for ranging, centroid guidance or active imaging. This allows for pointing control of a transmitter to be performed "closed loop" based on the desired and actual location of the laser spot on the target.

A staring optical sensor uses one or more detectors whose native FOV is sufficient individually or tiled together to address the desired FOR in the scene. To add active capabilities, the optical transmit beam may be steered over the FOR (or a portion thereof) using, for example, a gimbaled mirror, an optical phased array (OPA) or a waveguide such as a liquid crystal waveguide (LCWG).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a beam steering architecture for an optical sensor based upon a pair of Micro-Electro-Mechanical System (MEMS) Micro-Mirror Arrays (MMAs) and a fold mirror. The MEMS MMAs scan both primary and secondary FOR providing considerable flexibility to scan a scene to provide not only active imaging (to supplement passive imaging) but also simultaneously allowing for other optical functions such as, but not limited to, establishing a communications link, providing an optical transmit beam for another detection platform or determining range to an object. A special class of MEMS MMA that provides a "piston" capability in which the individual mirrors may translate enables a suite of optical functions to "shape" the optical transmit beam.

In an embodiment, the beam steerer of the optical sensor comprises a pair of MEMS MMAs and a fold mirror. A first steering MEMS MMA is positioned at an angle to receive and direct the optical transmit beam along a first optical path at a first reflection angle. The first steering MEMS MMA comprises at least one mirror responsive to command signals to tip and tilt to scan the optical transmit beam at a scan angle in first and second angular direction (e.g., Elevation and Azimuth) about the first reflection angle over a primary FOR. The fold mirror is positioned to intercept the re-directed optical transmit beam within a range of scan angles within the primary transmit FOR (e.g., a maximum scan angle at the edge of the primary transmit FOR or a scan angle at the center of primary FOR) and re-direct the optical transmit beam along a second optical path. The second steering MEMS MMA is positioned to receive and re-direct the optical transmit beam from the fold mirror along a third optical path at a second reflection angle and offset from the first optical path. The second steering MEMS MMA comprises at least one mirror responsive to command signals to tip and tilt to scan the optical transmit beam at a scan angle in the first and second angular directions about the second reflection angle over a secondary transmit FOR. Depending on the geometry of the MEMS MMAs, this may have the effect of extending the primary FOR in either the first or second angular directions in a contiguous, separating or overlapping FOR.

The pair of MEMS MMAs (and fold mirror) may have many different configurations to implement the beam steering architecture to scan the primary and secondary FOR. In one configuration, each single mirror in the first steering MEMS MMA is mapped to a corresponding single mirror in the second steering MEMS MMA, e.g., a 1-to-1 (1 mirror to 1 mirror) mapping. The single mirrors may be elements of first and second steering MEMS MMA that each comprise only a single mirror, a row or column of mirrors that are mapped 1-to-1 or full arrays of mirrors that are all mapped 1-to-1. In another configuration, each single mirror in the first steering MEMS MMA (only a single mirror, row or column, or an array) may be mapped to M mirrors in the second steering MEMS MMA to expand the secondary FOR in Azimuth and/or Elevation e.g. a 1-to-M (1 mirror to M mirror mapping. In yet another configuration, a plurality of N mirrors in the first steering MEMS MMA (row/column or array) may be mapped to a single mirror in the second steering MEMS MMA e.g. a N-to-1 (N mirror to 1 mirror) mapping. A "piston" capability of the MEMS MMA is selectively applied to all N mirrors to shape the optical transmit beam that is mapped to the single mirror in the second steering MEMS MMA. These can be combined into an N-to-M (N mirror to 1 mirror) mapping. In yet another configurations, the first and second steering MEMS MMAs are arrays (K mirrors×L mirrors) and (P mirrors×Q mirrors), respectively, which may be configured to implement any of the above mappings or a combination thereof. The arrays of mirrors also allows for partitioning the MMAs to generate and scan multiple optical transmit beams over the primary or secondary FOR and for spectral diversity within or among the beams.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1A and 1B are illustrations of an optical sensor mounted on a drone and an autonomous vehicle, respectively, in which in accordance with the present invention an optical sensor uses a pair of MEMS MMAs to steer an optical transmit beam to increase the FOR;

FIG. 2 is a simplified schematic diagram of an embodiment of an optical sensor in which a pair of MEMS MMAs to steer an optical transmit beam to increase the FOR;

FIGS. 6A through 6C illustrate different primary and secondary FOR combinations for the 1-to-1 mirror mapping;

FIGS. 9A and 9B are top and side views of an embodiment of the beam steering portion of the optical sensor in which a pair of MEMS MMAs and a fold mirror are configured to steer an optical transmit beam to increase the FOR in a N-to-1 mirror mapping in which mirror piston capability is used to shape the optical transmit beam onto the single mirror;

FIG. 12 is a Table illustrating various configurations of the pair of MEMS MMAs.

DETAILED DESCRIPTION OF THE INVENTION

Figure 1A:
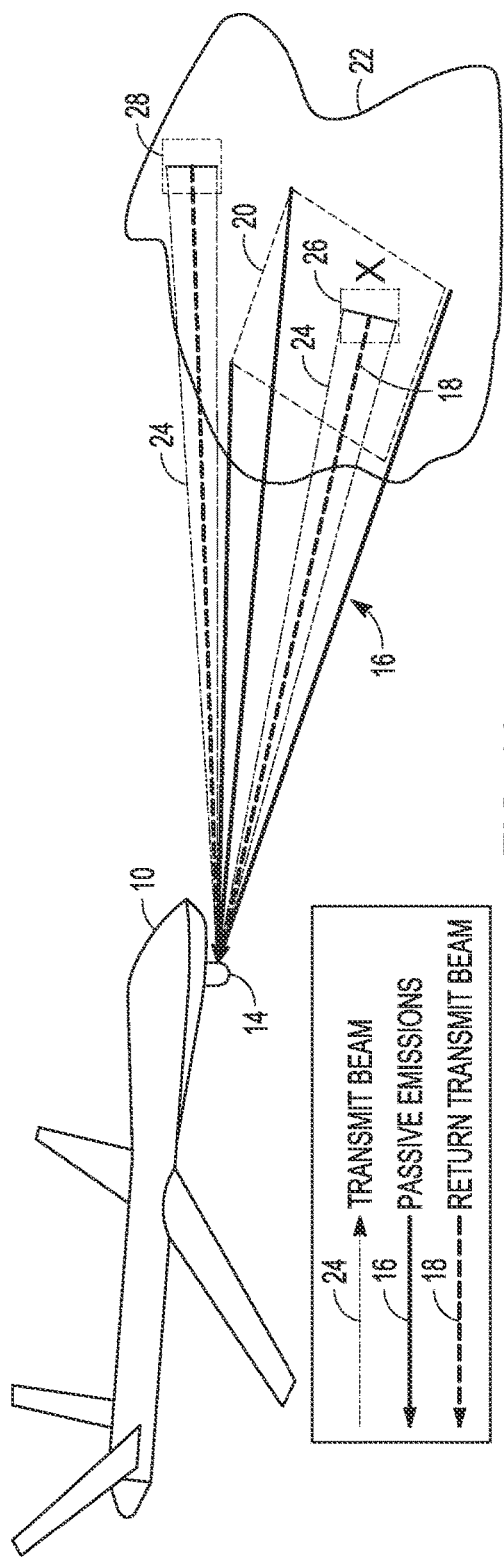

The present invention provides a unique beam steering architecture based upon a pair of Micro-Electro-Mechanical System (MEMS) Micro-Mirror Arrays (MMAs) to provide active beam steering capabilities to an optical sensor. The beam steering architecture may be used in context of gimbaled or non-gimbaled optical sensors with particular application to the latter. This approach scans both primary and secondary FOR providing considerable flexibility to scan a scene to provide not only active imaging (to supplement passive imaging) but also simultaneously allowing for other optical functions such as, but not limited to, establishing a communications link, providing an optical transmit beam for another detection platform or determining a range to an object. The use of MEMS MMAs allows for adaptively forming and scanning multiple optical transmit beams over one or both of the primary and secondary FOR and providing spectral diversity. The use of a special class of MEMS MMAs that provide a "piston" capability in which the individual mirrors may translate enables a suite of optical functions to "shape" the optical transmit beam including but not limited to adjusting the size, divergence or intensity profile of the beam, reducing distortion related to steering of the beam and producing deviations in the wavefront of the beam to compensate for atmospheric distortions or path length differences in the primary or secondary FOR. These beam shaping effects can be cascaded between the pair of MMAs to provide enhanced beam shaping to scan the secondary FOR.

Generally speaking, the mirrors are tipped and tilted about orthogonal axes (e.g. X and Y axes) to scan the optical transmit beam at a scan angle in a multidimensional space defined by $1^{st}$ and $2^{nd}$ angular directions (e.g., Elevation and Azimuth), which are orthogonal to each other. As used herein, the terms "Elevation" and "Azimuth" are used to refer to any arbitrary orthogonal pair of first and second angular directions and are interchangeable. Most generally, the mirrors would be commanded to tip and tilt to scan the optical transmit beam over Elevation for a fixed Azimuth of vice-versa. In an embodiment, the MEMS MMAs may be oriented such that tipping the mirror corresponds to scanning the beam in Elevation and tilting the mirror corresponds to scanning the beam in Azimuth. Without loss of generality and for purposes of clarity and simplicity, embodiments of the invention will be described in which the mirrors tip to scan the beam in Elevation and tilt to scan the beam in Azimuth Referring now to FIGS. 1A and 1B, in different embodiments an unmanned aerial vehicle (UAV) 10 such as a drone, missile, rocket, projectile etc. and an autonomous self-driving vehicle 12 such as a car, truck, drone, etc., which could be manned or unmanned, are provided with an optical sensor 14. Optical sensor 14 detects optical emissions that are collected by its receive telescope. In one case, the receive telescope can be mounted on a two-dimension gimbal to scan its field-of-view (FOV) in, for example, Elevation and Azimuth angular directions over a larger receive field-of-regard (FOR) 20 in a scene 22. In another case, the optical sensor is provided with one or more fixed staring detector's whose native FOV is sufficient to provide the desired FOR 20 without scanning the receive telescope. The optical sensor 14 detects passive emissions 16 from the scene that lie within receive FOR 20.

Figure 1B:
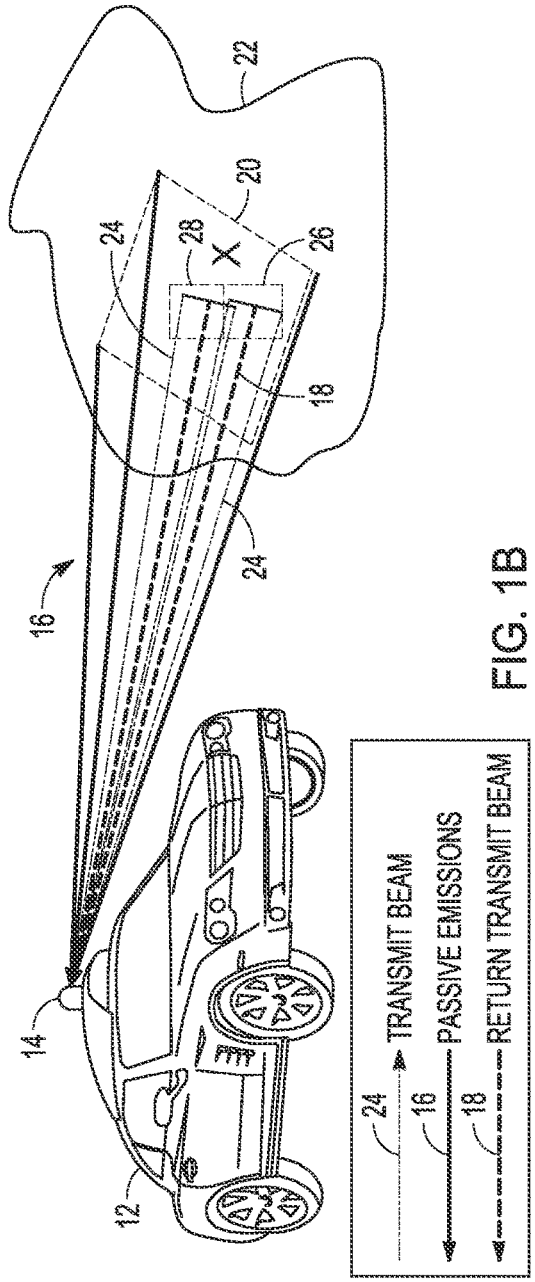

In the present invention, the optical sensor uses a pair of MEMS MMAs in a unique architecture to scan an optical transmit beam 24 (the "active signal") over primary and secondary transmit FOR 26 and 28, respectively, in scene 22, which reflects the light to generate a returned transmit beam 18. The pair of MEMS MMAs may effectively time-multiplex or split the optical transmit beam 24 to scan the primary and secondary FOR 26 and 28 sequentially or simultaneously without requiring an addition optical element e.g. a time-multiplexer or beam-splitter. As shown in FIG. 1b, the pair may be configured such that the secondary FOR 28 is a contiguous extension of the primary FOR 26 in, for example, the Elevation or Azimuth angular directions within the receive FOR 20 to actively image the scene. As shown in FIG. 1a, the pair may be configured such that the primary FOR 26 lies within the receive FOR 20 to actively image that portion of the scene while the secondary FOR 28 lies outside the receive FOR 20 to provide an optical beam for another imaging platform, to establish a communications link or to determine a range to target. As will be discussed in further details, the use of a pair of MEMS MMAs provides the capability and flexibility to adapt a single optical transmit beam to scan multiple beams over the primary or secondary FOR representing a single wavelength or a diversity of wavelengths, and for certain types of MEMS MMA to "shape" the optical transmit beam.

The optical transmit beam, and thus the returns, may be in the same or different band as the passive emissions. For example, the passive emissions may span a portion of the NIR band and the optical transmit beam could occupy a very narrow band (few nm) around a specific wavelength(s) in the NIR band. Alternately, the passive emissions may span a portion of the NIR band and the optical transmit beam could occupy a narrow band around a specific wavelengths(s) in the Visible band. Other combinations of in and out of band active and passive emissions will exist. Both the passive emissions 16 and the returned transmit beam 18 are collected by the sensor's receive telescope and directed to a detector.

Figure 2:
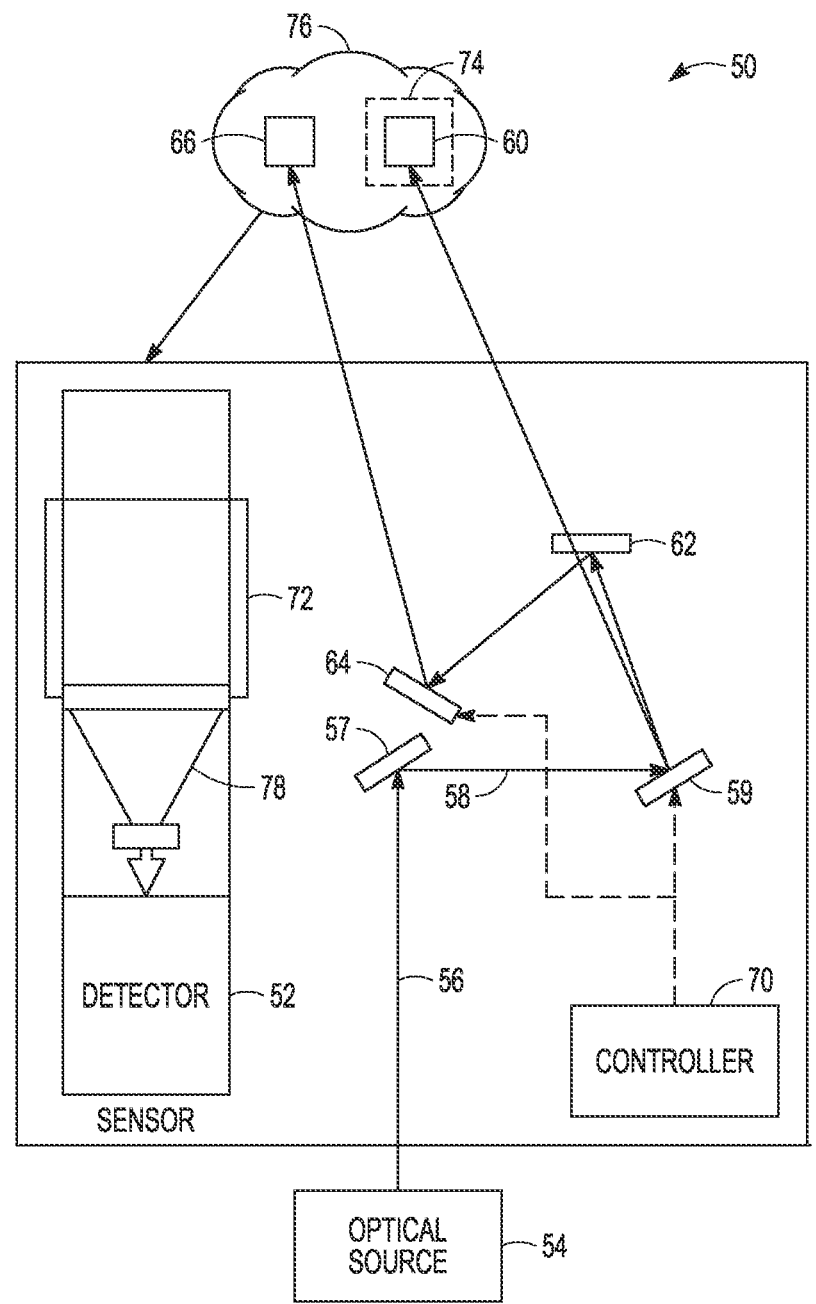

Referring now to FIG. 2, an embodiment of an optical sensor 50 includes a detector 52 responsive to light in a band of wavelengths and an optical source 54 that emits an optical transmit beam 56 along an optical axis 58 (via a fold mirror 57 in this packaging configuration) at a transmission wavelength within the band. In certain embodiments, multiple sources 54 at different wavelengths may be used to provide spectral diversity for the active system.

A first steering MEMS MMA 59 is positioned at an angle to the optical axis to receive and re-direct the optical transmit beam along a first optical path at a first reflection angle in Elevation. The first steering MEMS MMA comprises at least one mirror responsive to command signals to tip in Elevation about the first reflection angle and tilt in Azimuth over respective angular ranges to scan the optical transmit beam at a scan angle about the first reflection angle over a primary transmit field-of-regard (FOR) 60. In certain embodiments in which multiple mirrors are used to scan the optical transmit beam, the mirrors may be configured responsive to command signals to "piston" (translate) to "shape" the optical transmit beam to perform one or more optical tasks on the beam.

A fold mirror 62 is positioned to intercept the re-directed optical transmit beam 56 at a range of scan angles in Elevation and Azimuth within the primary transmit FOR and re-direct the optical transmit beam along a second optical path. In different embodiments, the range of scan angles may be placed at either an edge, the center or anywhere within the primary FOR. As will be discussed, the extent of the range of scan angles in Elevation or Azimuth will depend on the mirror mapping implemented in a given configuration. For example, in a 1-to-1 mapping, the Az and El angles of the scan can be fixed so the fold mirror can be quite small to intercept and re-direct the beam. In a 1-to-M mapping to extend the secondary FOR in Azimuth, the range of angles in at least Az must be extended to receive the beam scanned in Az. The fold mirror must be extended commensurately in Az.

A second steering MEMS MMA 64 is positioned to receive and re-direct the optical transmit beam 56 from the fold mirror along a third optical path at a second reflection angle and offset from the first optical path. The second steering MEMS MMA comprises at least one mirror responsive to command signals to tip in Elevation about the second reflection angle and tilt in Azimuth over respective angular ranges to scan the optical transmit beam at a scan angle about the second reflection angle over a secondary transmit FOR 66. In this particular configuration, a combined transmit FOR of the primary and secondary transmit FOR is extended in Elevation. In certain embodiments in which multiple mirrors are used to scan the optical transmit beam, the mirrors may be configured responsive to command signals to "piston" (translate) to "shape" the optical transmit beam 56 to perform one or more optical tasks on the beam. Cascading of the first and second steering MEMS MMA provides for additional control and beam shaping.

A controller 70 is configured to issue command signals to said first and second steering MEMS MMAs to scan the optical transmit beam 56 over the primary and secondary transmit FOR 60 and 66, respectively. For example, the controller issues command signals to the first steering MEMS MMA to tip and tilt the at least one mirror to scan the optical transmit beam over the primary transmit FOR. To implement a time-multiplexed system, the controller then issues command signals to the first steering MEMS MMA to set the tip and tilt of the at least one mirror at within the range of scan angles in Elevation and Azimuth to re-direct the optical transmit beam off of the fold mirror to the single mirror of the second steering MEMS MMA and issues command signals to the second steering MEMS MMA to tip and tilt the at least one mirror to scan the optical transmit beam over the secondary transmit FOR. The controller switches back and forth between the sets of command signals to scan the primary and secondary transmit FOR in a time-multiplexed fashion. In an alternate configuration akin to a beam-splitter, the controller issues command signals to a segment of the first steering MEMS MMA to scan the primary FOR and issues command signals to another segment of the first steering MEMS MMA such that the optical transmit beam is reflected off of the fold mirror to the second steering MEMS MMA to scan the secondary FOR.

A receive telescope 72 is configured to receive optical emissions, passive or active, within a receive FOR 74 in a scene 76. Depending upon the application, a portion or all of neither, one or both of the primary and secondary transmit FOR 60 and 66 may lie within the receive FOR 74. Either the primary or secondary transmit FOR that lie within the receive FOR 74 will generate a return transmit beam that is received by telescope 72. Either or both of the primary and secondary transmit FOR may be used for other optical functions such as, but not limited to, establishing an optical communications link, providing an active signal for another detection platform or for determining a range to target.

An optical system 78 couples light from the receive telescope to the detector 54 to image a portion of a scene within the receive FOR. The optical system may, for example, include a two-axis gimbal that steers a FOV over the receive FOR and routes the received passive emissions and/or returned transmit beam to an off-gimbal detector. Alternately, the optical system may include fixed optics that form an image on one or more tiled staring detectors whose combined FOV form the receive FOR.

The pair of MEMS MMAs (and fold mirror) may have many different configurations to implement the beam steering architecture to scan the primary and secondary FOR. In one configuration, each single mirror in the first steering MEMS MMA is mapped to a corresponding single mirror in the second steering MEMS MMA e.g. a 1-to-1 mapping. The single mirrors may be elements of first and second steering MEMS MMA that each comprise only a single mirror, a row or column of mirrors that are mapped 1-to-1 or an full array of mirrors that are mapped 1-to-1. In another configuration, each single mirror in the first steering MEMS MMA (only a single mirror, row or column, or an array) may be mapped to M mirrors in the second steering MEMS MMA to expand the secondary FOR in Azimuth e.g. a 1-to-M mapping. In yet another configuration, a plurality of N mirrors in the second steering MEMS MMA (row/column or array) may be mapped to a single mirror in the second steering MEMS MMA e.g., a N-to-1 mapping. A "piston" capability of the MEMS MMA is selectively applied to all N mirrors to shape the optical transmit beam that is mapped to the single mirror in the second steering MEMS MMA. These can be combined into an N-to-M mapping. In yet another configurations, the first and second steering MEMS MMAs are arrays (K×L) and (P×Q), respectively, which may be configured to implement any of the above mappings or a combination thereof.

In different embodiments, additional secondary FOR 66 may be scanned by placement of additional fold mirrors 62 at, for example, the opposite edge of the FOR in Elevation and/or at one or more of the edges of the FOR in Azimuth.

Figure 3A:
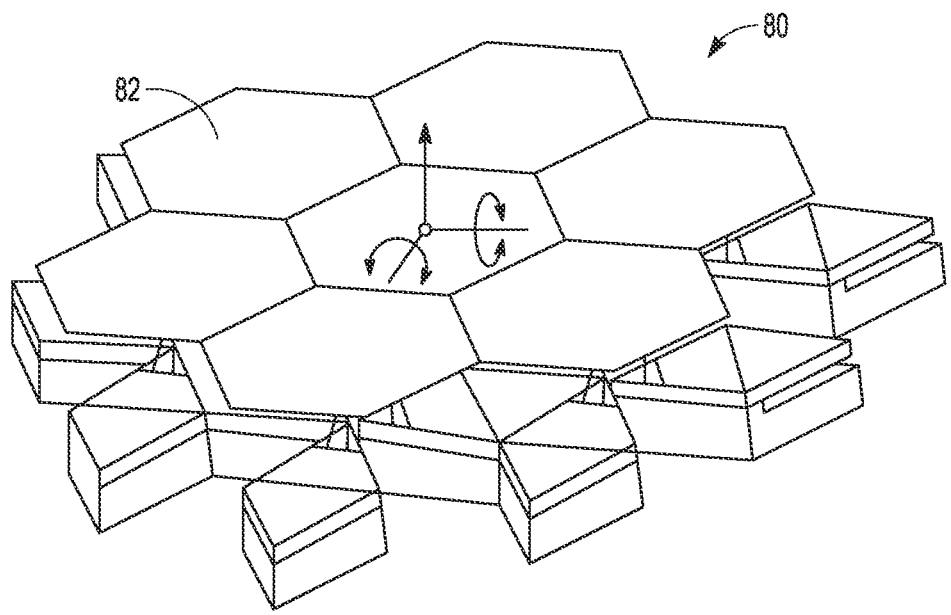
FIGS. 3A and 3B are illustrations of an embodiment of a Tip/Tilt/Piston ("TTP") MEMS MMA and a single mirror actuated to tip, tilt and piston (translate)
Figure 3B:
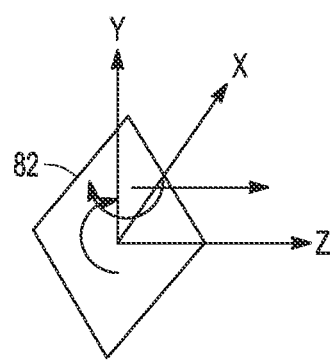
Figure 4A:
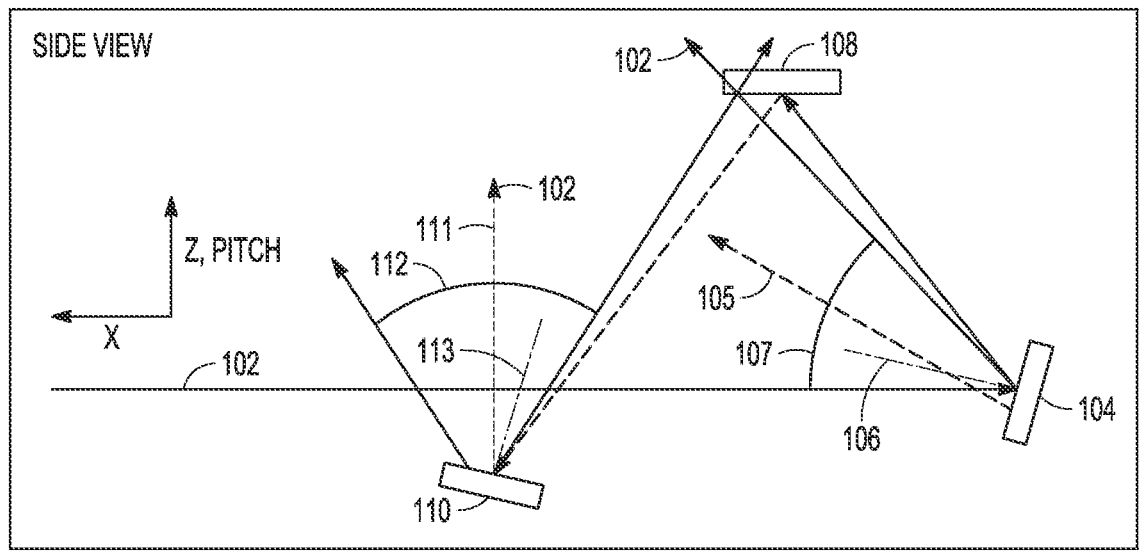
FIGS. 4A and 4B are top and side views of an embodiment of the beam steering portion of the optical sensor in which a pair of MEMS MMAs and a fold mirror are configured to steer an optical transmit beam to increase the FOR in a 1-to-1 mirror mapping.
Figure 4B:
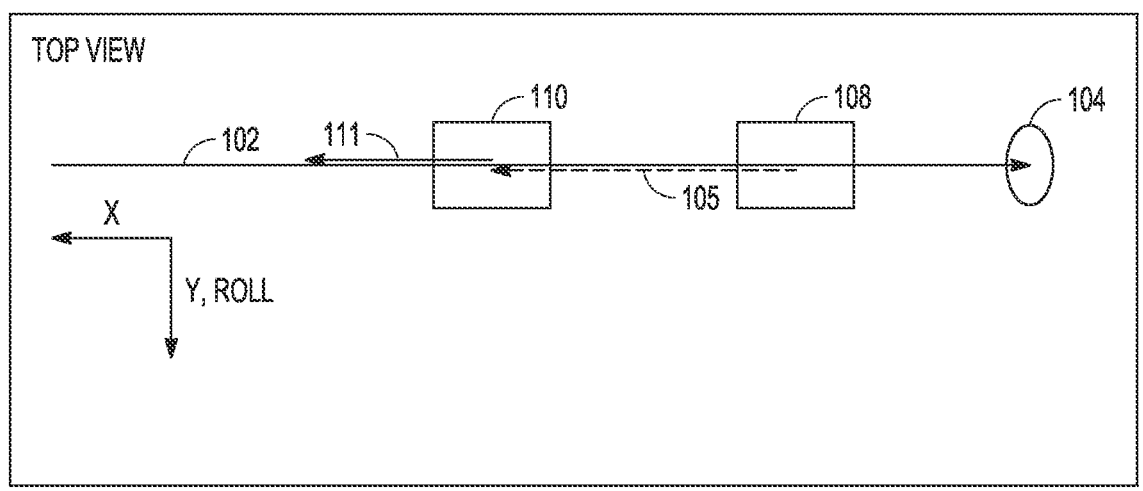

As best shown in FIGS. 3A-3B, a Micro-Electro-Mechanical System (MEMS) Micro-Mirror Array (MMA) 80 comprises a plurality of independently and continuously controllable mirrors 82 arranged in a 2D array in the XY plane to form and steer the optical transmit beam(s). Each mirror is capable of at least "Tip" (rotation about an X-axis) and "Tilt" (rotation about a Y-axis). In preferred embodiments, each mirror is also capable of "Piston" (translation along a Z-axis, perpendicular to the XY plane) where the X, Y and Z are orthogonal axes in a three-dimensional space. The Piston capability can be used generically speaking to "shape" the beam(s) that are reflected off of the MEMS MMA.

The piston capability be used to perform beam shaping functions such as to focus the beam in size or shape. The Piston capability can also be used to adjust the size, divergence or intensity profile of the beam, produce deviations in the wavefront of the beam to compensate for atmospheric distortions, adjust phase to maintain a zero phase difference across the wavefront of the beam, add optical power to the beam to focus or defocus the beam or to improve the formation and steering of the beam by approximating a continuous surface across the micro-mirrors, which reduces unwanted diffraction to increase power in the f optical beam.

More specifically, for small angle beam steering the Piston capability can be used to provide the requisite translation of mirrors within a section to approximate a continuous surface at a specified steering angle (combined tip and tilt angles). The maximum amount of translation "z" of the mirror to Piston limits the maximum steering angle that can be serviced for a given grouping of mirrors in a section. The greater the number of mirrors, the smaller the maximum steering angle. More specifically, the maximum angle is given by arcsin(z/w) where w is the width of the section e.g. number of mirrors in a given direction multiplied by the width of the mirror. Therefore, for small angles, the MEMS MMA can be partitioned into a small number of sections thereby limiting the number of edge discontinuities, hence the amount of diffraction.

The MEMS MMA is preferably capable of steering an output laser beam over a range of at least −15°×+15° in tip and tilt (30°×30° in steering range) and +/−15 microns (at least one-half wavelength in either direction) piston at a rate of at least 1 KHz (<1 millisecond). The independently controllable mirrors can be adaptively segmented to form any number of optical beams, adjust the size/power of a given optical beam, generate multi-spectral optical beams and to combine multiple input sources. Further, the MEMS MMA must have a sufficient number of mirrors, mirror size/resolution, fill factor, range of motion, response time, response accuracy and uniformity across the array.

One such MEMS MMA is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures to support each mirror at three fulcrum points (or vertices) of an equilateral triangle. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

Without loss of generality, embodiments of the invention will be described in context of a MEMS MMA that provides −15°×+15° in tip and tilt (30°×30° in steering range) and +/−15 microns of translation. In different embodiments, the MMAs may include only a single mirror, rows of mirrors or row/column arrays of mirror. A specific example will be show in which the primary FOR spans 0-60° in Elevation and +/−30° in Azimuth. The base secondary FOR is contiguous with and extends the primary FOR in Elevation, the secondary FOR itself spanning 60-120° in Elevation and +/−30° in Azimuth. Other variants of the primary and secondary FOR will be illustrated.

Figure 5B:
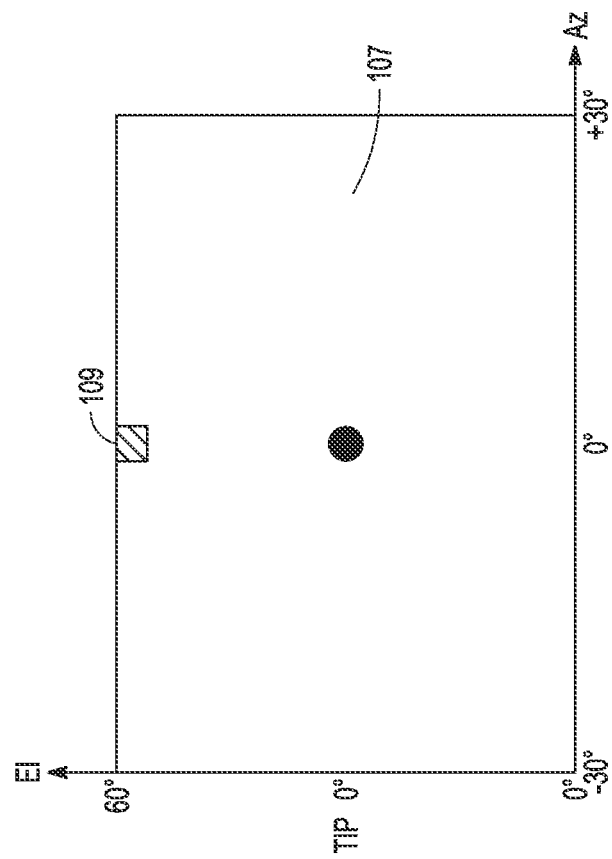
FIGS. 5A and 5B illustrate the primary FOR addressed by the first steering MEMS MMA and the interception of the optical transmit beam at the edge of the Elevation FOR by the fold mirror to re-direct the optical transmit beam to the second steering MEMS MMA to scan the secondary FOR for the 1-to-1 mirror mapping.
Figure 5A:
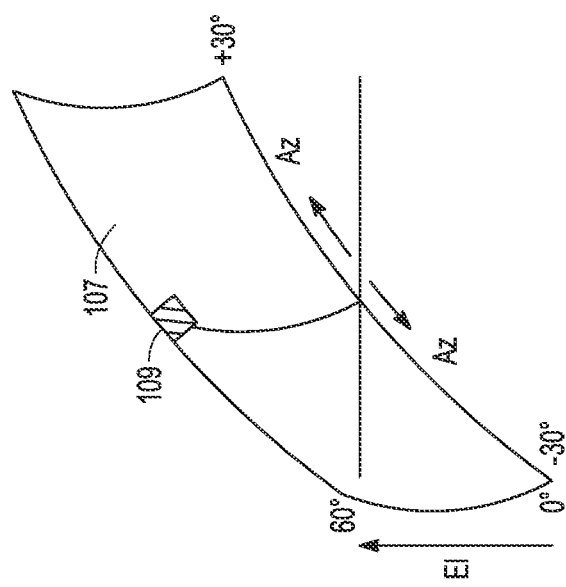

Referring now to FIGS. 4A-4B, 5A-5B and 6A-6C, and for simplicity assuming a 1-to-1 mapping between mirrors in the first and second steering MEMS MMAs, an optical beam steerer 100 of an optical sensor receives an optical transmit beam 102 along an optical axis. A first steering MEMS MMA 104 is positioned at an angle (e.g. 15°) to the optical axis to receive and nominally re-direct the optical transmit beam along a first optical path 105 at a first reflection angle (e.g. 30°) to a surface normal 106 in Elevation. The MMA's+/−15° in tip (Elevation) and tilt (Azimuth) scans the optical transmit bean 102 about the first reflection angle over a primary FOR 107 of 0-60° in Elevation and +/−30° in Azimuth as shown in FIGS. 5A and 6A.

A fold mirror 108 is positioned to intercept the re-directed optical transmit beam 102 at a range of scan angles 109 (e.g., 60° Elevation and 0° Azimuth) within the primary transmit FOR and re-direct the optical transmit beam along a second optical path. As shown in FIGS. 5A and 5B, to maximize the useful primary transmit FOR, the fold mirror 108 is suitably positioned at a max tip angle in Elevation at the edge of the primary transmit FOR. Alternately, fold mirror 108 could be placed at the center of the primary transmit FOR or anywhere within the primary transmit FOR.

A second steering MEMS MMA 110 is positioned to receive and nominally re-direct the optical transmit beam from the fold mirror along a third optical path 111 at a second reflection angle to a surface normal 113 and offset from the first optical path. As shown, the surface normal angle is 900 in Elevation, which is offset from the first reflection angle of 30° in Elevation by 60°. As a result, MMA's+/−15° in tip (Elevation) and tilt (Azimuth) scans the optical transmit bean 102 about the second reflection angle over a secondary FOR 112 of 60-120° in Elevation and +/−30° in Azimuth. The same FOR as the primary but offset by 60°. As a result, a combined FOR is contiguously extended in Elevation.

As exemplified in FIGS. 6B and 6C, the relationship of the primary and secondary FOR 107 and 112 can be set by changing the arrangement or packaging of the components to change the relationship of the second reflection angle and third optical path to the first reflection angle and path. As shown in FIG. 6B, the primary and secondary FOR 107 and 112 are separated and offset. As shown in FIG. 6C, the primary and secondary FOR 107 and 112 overlap.

As described, to scan the secondary FOR 112 the tip angle in Elevation of the at least one mirror in MEMS MMA 104 is set (in response to commands issued by the controller) at a specified angle 109 such that the optical transmit beam 102 is intercepted by the fold mirror 108. How the tilt angle in Azimuth of the at least one mirror in MEMS MMA 104 is controlled depends on the particular configuration of the pair of MEMS MMAs to implement the beam steerer. In a 1-to-1 mapping of each mirror in the first steering MEMS MMA to each mirror in the second steering MEMS MMA (perhaps only a single mirror in each), the scan angle in Azimuth from the first steering MEMS MMA must be fixed to point the re-directed optical transmit beam at the corresponding mirror in the second steering MEMS MMA. This may be done by setting the tilt in Azimuth at a specified angle (e.g. 0°) in response to commands signals from the controller. Alternately, the fold mirror could be configured to map all Azimuth angles and re-direct the optical transmit beam onto the single mirror in the second steering MEMS MMA although this occludes the primary transmit FOR across the entire angular range in Azimuth for the fixed Elevation angle. Either approach enables a beam steerer in which each of the first and second steering MEMS MMAs comprise only a single mirror to scan the optical transmit beam over the primary and secondary FOR.

Figure 7A:
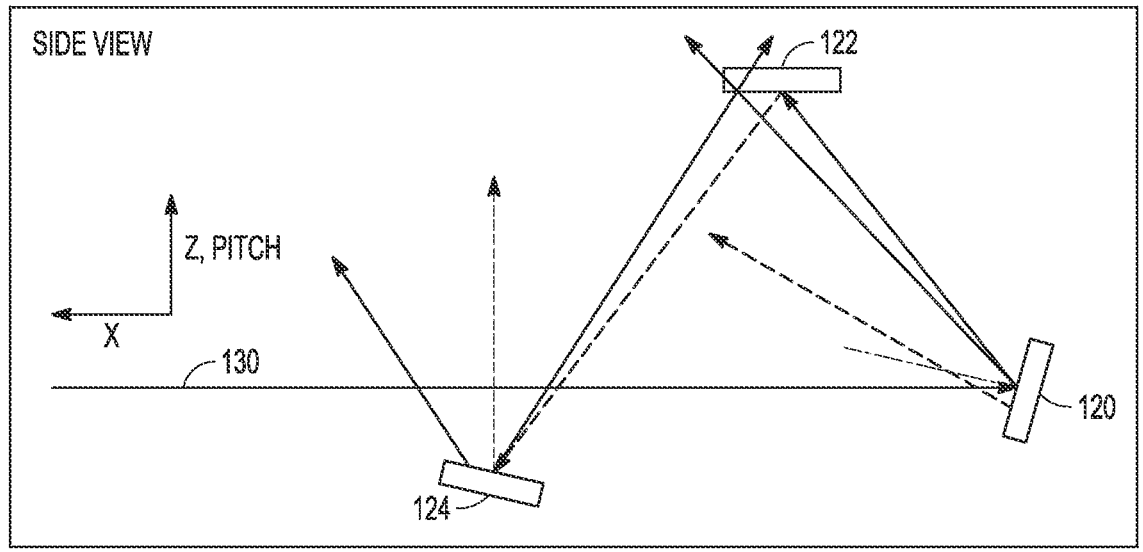
FIGS. 7A and 7B are top and side views of an embodiment of the beam steering portion of the optical sensor in which a pair of MEMS MMAs and a fold mirror are configured to steer an optical transmit beam to extend the secondary FOR in a 1-to-M mirror mapping.
Figure 7B:
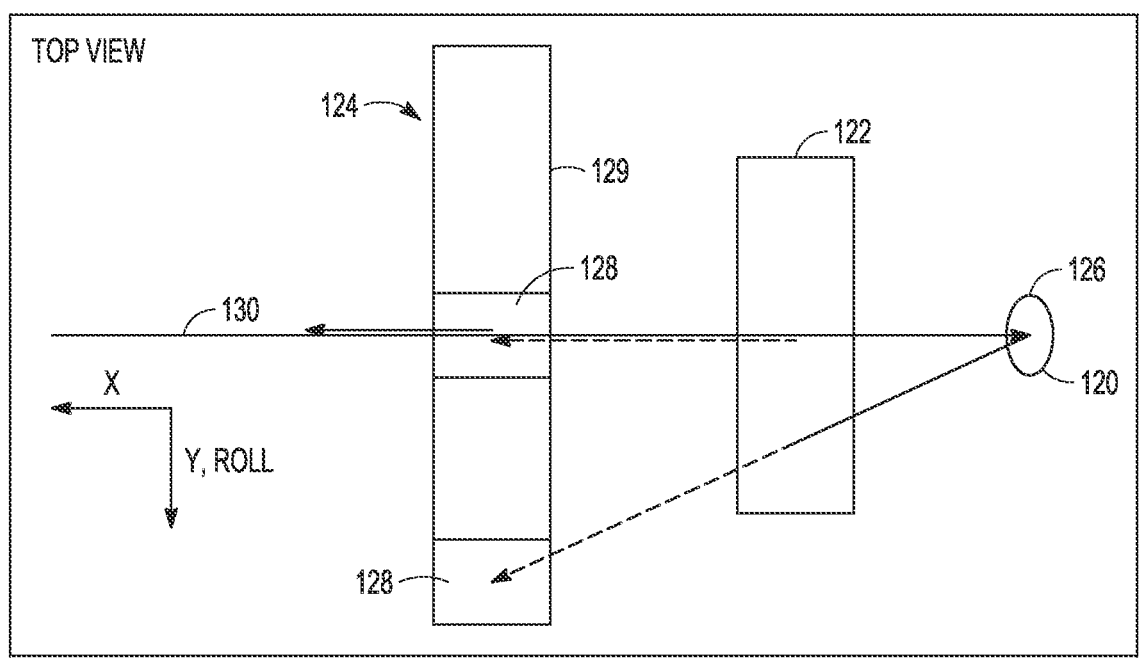
Figure 8:
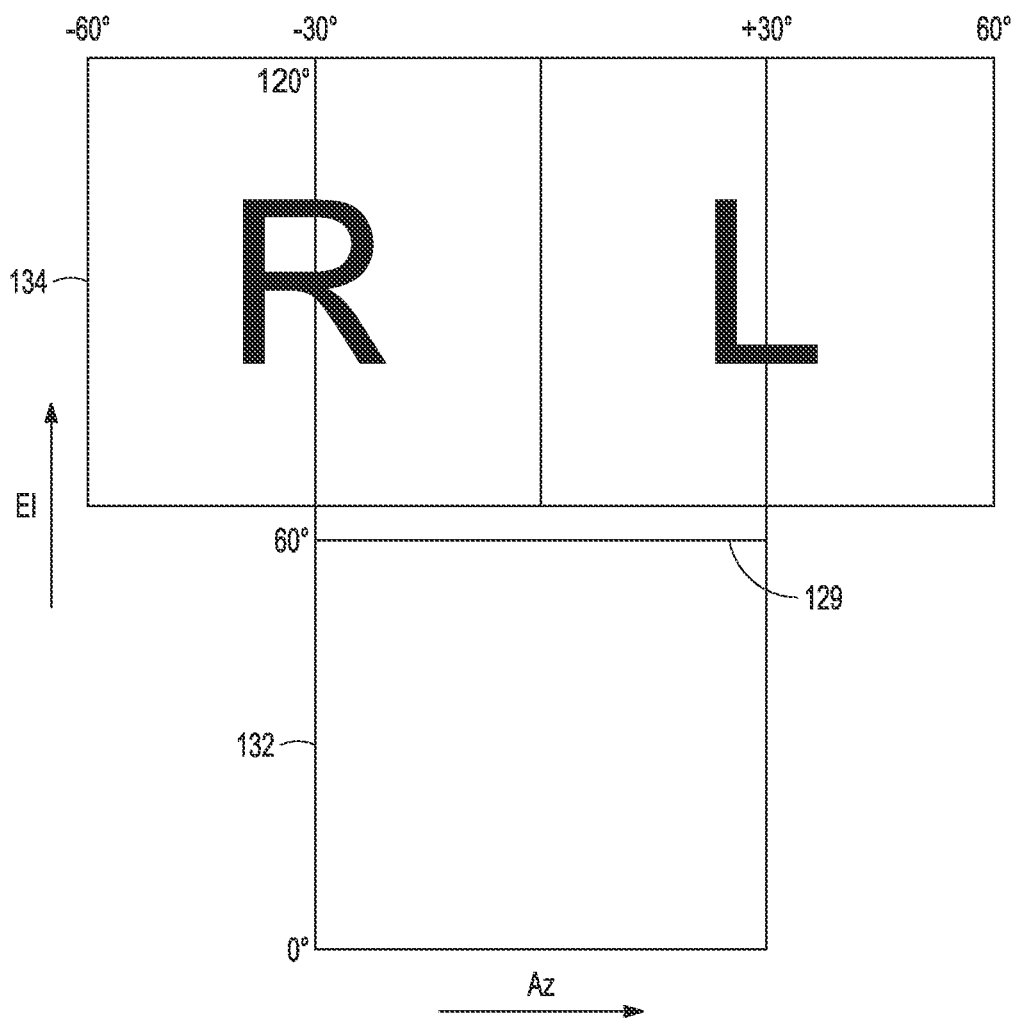
FIG. 8 illustrates an extension of the secondary FOR in Azimuth for the 1-to-M mirror mapping

Referring now to FIGS. 7A-B and 8, an embodiment of a beam steerer 118 includes a first steering MEMS MMA 120, a fold mirror 122, and a second steering MEMS MMA 124 that implement a 1-to-M mapping of each mirror 126 in the first steering MEMS MMA to M mirrors 128, preferably in a row 129, in the second steering MEMS MMA (perhaps only a single mirror in the first steering MEMS MMA). Fold mirror 122 and second steering MEMS MMA 124 are extended in Azimuth (Y-axis) to accommodate the scanning by the first steering MEMS MMA in Azimuth for the 1-to-M mapping. The extension of the fold mirror has the effect of extending the range of scan angles 129 in Az while leaving the range of scan angles in El at, for example, a single or narrowband of angles. The extension in Azimuth may be the entire angular range in Azimuth supported by the mirrors in the first steering MEMS MMA or a portion thereof.

In response to command signals, the first steering MEMS MMA tips and tilts mirror 126 to scan an optical transmit beam 130 over a primary transmit FOR 132. The first steering MEMS MMA fixes the tip of mirror 126 to direct the beam 130 onto the fold mirror and tilts mirror 126 over the angular range in Az to scan optical transmit beam 130 across the M mirrors 128. The second MMA tips and tilts the mirror 128 on which the beam is incident to scan the optical transmit beam over a secondary FOR 134, which is extended in Azimuth due to the cascading effect of the Azimuth scan of both the first and second steering MEMS MMAs. In the current example, the secondary FOR 134 is extended by 30° in each direction and now spans 60-120° in Elevation and +/−60° in Azimuth. In order to map the optical transmit beam to a row of M mirrors 128, the system must compensate for path length differences to those mirrors. This may be accomplished by extending the range of angles in Elevation and scanning an arc across the fold mirror in Azimuth and Elevation.

Figure 9A:
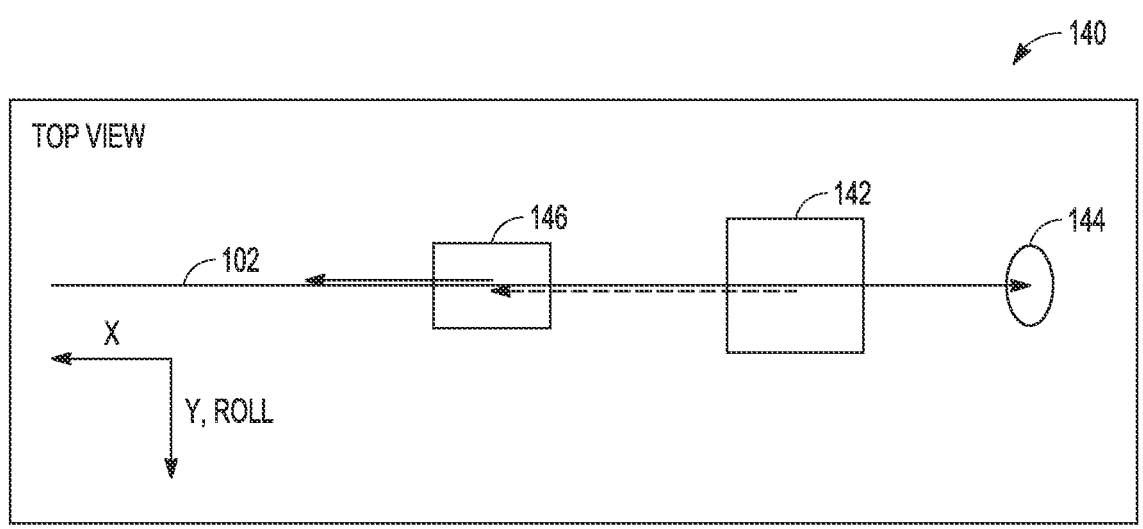

Referring now to FIGS. 9A and 9B, an embodiment of a beam steerer 140 includes a first steering MEMS MMA 142, a fold mirror 144, and a second steering MEMS MMA 146 that implement a N-to-1 mapping of N mirrors 148 in the first steering MEMS MMA to a mirror 150 (perhaps only a single mirror in the second steering MEMS MMA). Fold mirror 144 and second steering MEMS MMA 146 are extended in Azimuth (Y-axis) and Elevation (X-axis) to accommodate the scanning by the first steering MEMS MMA in Azimuth and Elevation for the N-to-1 mapping. To scan the secondary transmit FOR, n response to command signals, the mirrors 148 are selectively translated ("pistoned") 152 to shape an optical transmit beam 153 and tilted in Azimuth to re-direct the shaped optical beam onto mirror 150, which in turn is tipped and tilted to scan the shaped optical transmit beam over the secondary transmit FOR.

The piston capability be used to perform beam shaping functions such as to focus the beam in size or shape. The Piston capability can also be used to adjust the size, divergence or intensity profile of the beam, produce deviations in the wavefront of the beam to compensate for atmospheric distortions, adjust phase to maintain a zero phase difference across the wavefront of the beam, add optical power to the beam to focus or defocus the beam or to improve the formation and steering of the beam by approximating a continuous surface 154 across the micro-mirrors, which reduces unwanted diffraction to increase power in the f optical beam.

More specifically, for small angle beam steering the Piston capability can be used to provide the requisite translation of mirrors within a section to approximate a continuous surface at a specified steering angle (combined tip and tilt angles). The maximum amount of translation "z" of the mirror to Piston limits the maximum steering angle that can be serviced for a given grouping of mirrors in a section. The greater the number of mirrors, the smaller the maximum steering angle. More specifically, the maximum angle is given by arcsin(z/w) where w is the width of the section e.g. number of mirrors in a given direction multiplied by the width of the mirror. Therefore, for small angles, the MEMS MMA can be partitioned into a small number of sections thereby limiting the number of edge discontinuities, hence the amount of diffraction.

Figure 10A:
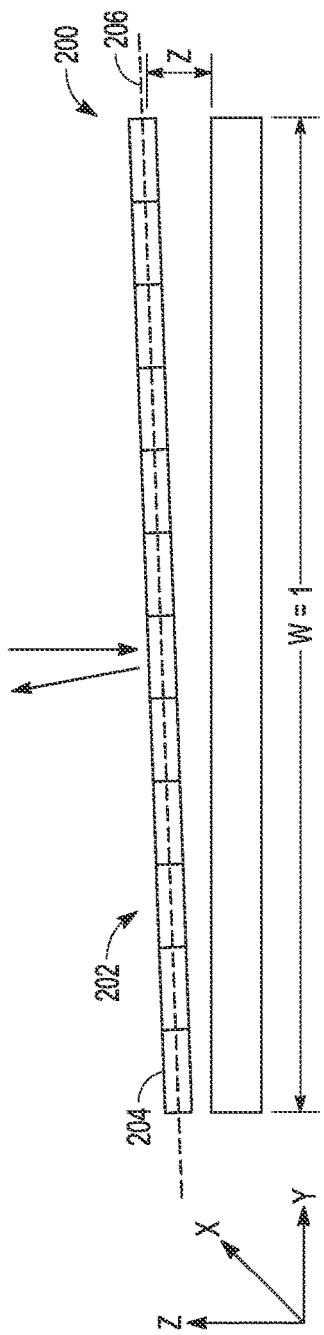
FIGS. 10A through 10C illustrate a MEMS MMA that is partitioned into a minimum number of sections to provide a specified steering angle and configured via tip, tilt and piston to approximate a continuous surface at the specified steering angle for each segment to reduce diffraction in an N-to-1 mirror mapping.
Figure 10B:
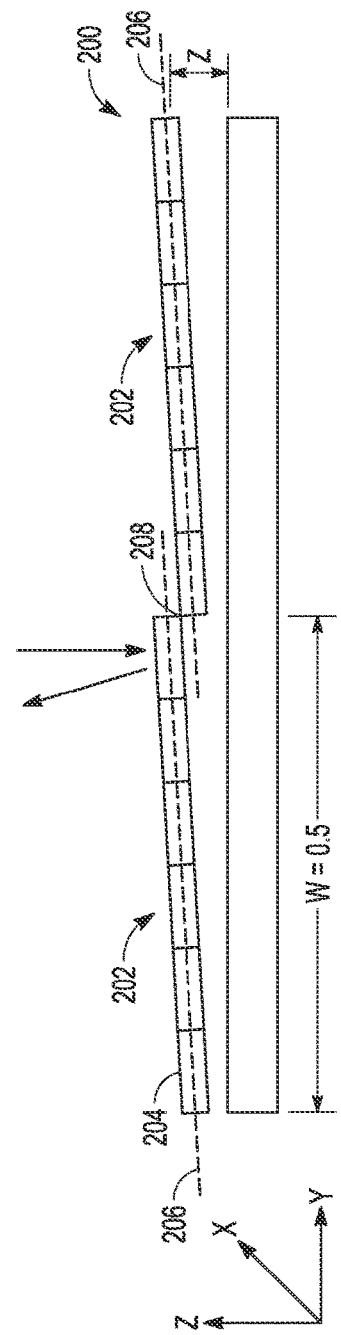
Figure 10C:
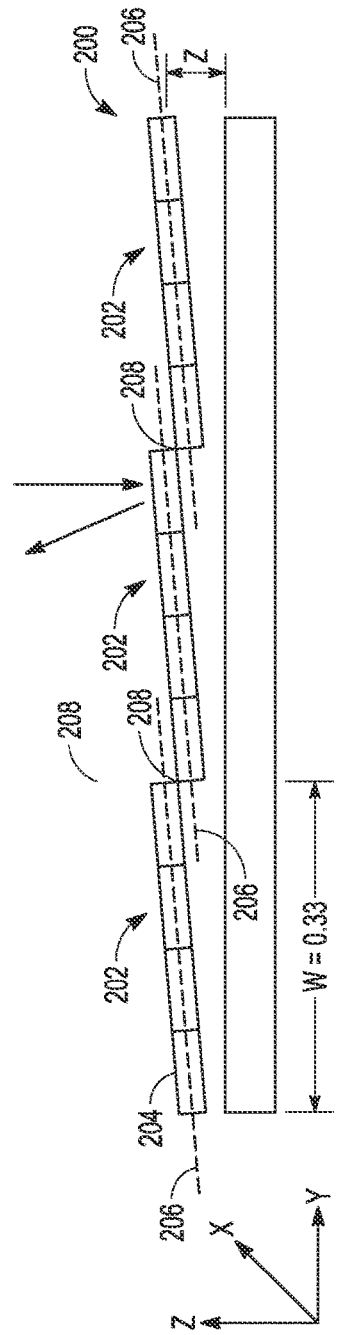

As shown in FIGS. 10A-10C, a MEMS MMA 200 is partitioned into one or more sections 202 with each section including a plurality of mirrors 204 exhibiting tip, tilt and piston capabilities. To provide a specified scan angle, all of the mirrors within a section and all of the mirrors between different sections are tipped and tilted about the X and Y axes, respectively, at the same tip and tilt angles. Each mirror within a section is pistoned (translated along the Z axis) by a requisite amount such that the mirrors approximate a continuous surface 206 across the section. The maximum angle, tip or tilt, that can be achieved is given by arcsin(z/w) where z is the maximum piston stroke (translation along z) and w is the width of the section (e.g. for tip, the number of mirrors and width of each mirror along the Y axis). For larger values of w (more mirrors grouped into a section), the maximum tilt angle, hence steering angle is smaller. Therefore, for small steering angles the number of sections N can be reduced to minimize diffraction off of edge discontinuities 208 between sections for a specified steering angle.

Each of the 1-to-1, 1-to-M, N-to-1 or N-to-M mappings can also be implemented within an array (K×L)-to-array (P×Q) mapping to separately or in combination realize the benefits of extending the secondary FOR in Azimuth and shaping of the optical transmit beam. In addition, the array-to-array mapping can provide additional unique beam steering capabilities such as forming and scanning multiple optical transmit beams (from a single input optical transmit beam) over the primary and secondary FOR. The number of beams used to scan the primary and secondary FOR can be the same or different and can be adapted (in response to command signals) on the fly as conditions demand. Furthermore, the optical transmit beam(s) may exhibit a spectral diversity that is useful for many different applications. A single beam may include multiple wavelengths or multiple different beams, scanned over the same or different portions of the FOR, may include different wavelengths.

Figure 11A:
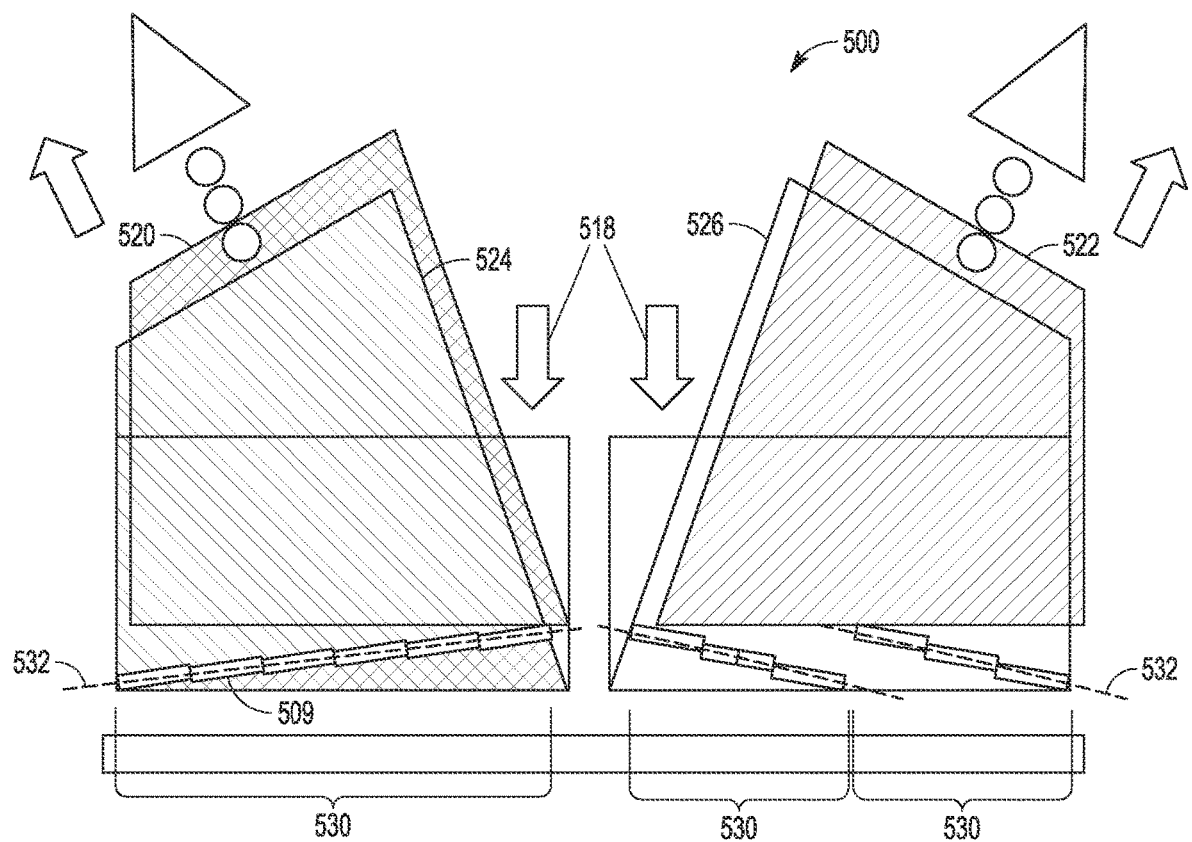
FIGS. 11A and 11B are an example of a MEMS MMA configured to form and steer multiple optical transmit beams at different wavelengths.
Figure 11B:
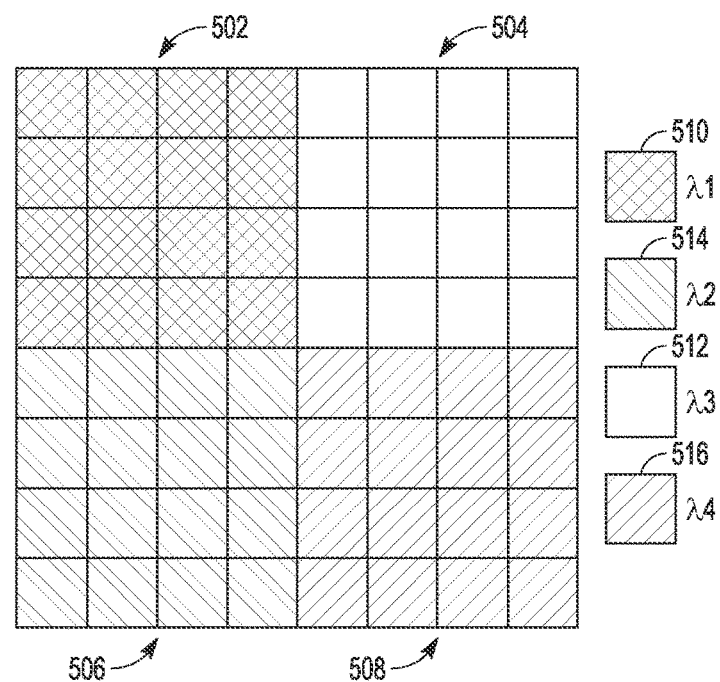

As illustrated in FIGS. 11A-11B, in an embodiment of an array-to-array mapping responsive to command signals from the controller, a MEMS MMA 500, either the first, second or both steering MEMS MMAs, is partitioned into four segments 502, 504, 506 and 508 each including a plurality of mirrors 509 illuminated by optical radiation 518 (the input optical transmit beam). The mirrors in the different sections are provided with reflective coatings 510, 512, 514 and 516 at different wavelengths. In response to command signals, the MEMS MMA tips/tilts/pistons the mirrors in each segment to independently form and scan optical transmit beams 520, 522, 524 and 526 over different portions of the scene and different primary or secondary FOR. In this example, within each segment, the controller generates command signals to further partition the segment into one or more sections 530 of mirrors 509 to approximate a continuous surface(s) 532 at the specified steering angle to minimize diffraction for each of the optical transmit beams.

Additional piston actuation may be included to compensate for path length variation and/or to correct for atmospheric distortion in some or all of the optical transmit beams at the different wavelengths. In response to command signals, the MEMS MMA may form and scan all of the optical transmit beams over the same primary (or secondary) FOR of the scene to provide multi-spectral illumination. Alternately, the MEMS MMA may scan one or more of the optical transmit beams over the first portion of the scene while scanning one or more of the optical beams at different wavelengths over a different portion of the scene e.g. features in previously scanned regions of the scene. In addition, one or more segments at a given wavelength may be partitioned into multiple sub-segments thereby generate a plurality of independently scanned optical transmit beams at the given wavelength.

Referring now to FIG. 12, a Table 600 compares the 1-to-1, 1-to-M, N-to-1 and N-to-M mappings.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical sensor, comprising:
   a detector responsive to light in a band of wavelengths;
   an optical source that emits an optical transmit beam along an optical axis at a transmission wavelength within the band;
   a first steering Micro-Electro-Mechanical System (MEMS) Micro-Mirror Array (MMA) positioned at an angle to the optical axis to receive and re-direct the optical transmit beam along a first optical path at a first reflection angle, said first steering MEMS MMA comprising at least one mirror responsive to command signals to tip and tilt to scan the optical transmit beam at a scan angle in first and second angular directions about the first reflection angle over a primary transmit field-of-regard (FOR);
   a fold mirror positioned to intercept the re-directed optical transmit beam at a range of scan angles within the primary transmit FOR and re-direct the optical transmit beam along a second optical path;
   a second steering MEMS MMA positioned to receive and re-direct the optical transmit beam from the fold mirror along a third optical path at a second reflection angle and offset from the first optical path, said second steering MEMS MMA comprising at least one mirror responsive to command signals to tip and tilt to scan the optical transmit beam at a scan angle in said first and second directions about the second reflection angle over a secondary transmit FOR;
   a controller configured to issue command signals to said first and second steering MEMS MMAs to scan the optical transmit beam over the primary and secondary transmit FOR;
   a receive telescope that receives light within a receive FOR; and
   an optical system that couples light from the receive telescope to the detector to image a portion of a scene within the receive FOR.

2. The optical sensor of claim 1, wherein said first and second steering MEMS MMAs each comprise only a single mirror, said controller is configured to (a) issue command signals to the first steering MEMS MMA to tip and tilt the single mirror to scan the optical transmit beam over the primary transmit FOR and to (b) issue command signals to the first steering MEMS MMA to set the tip and tilt of the single mirror at a specified scan angle within the range of scan angles to re-direct the optical transmit beam off of the fold mirror to the single mirror of the second steering MEMS MMA and to issue command signals to the second steering MEMS MMA to tip and tilt the single mirror to scan the optical transmit beam over the secondary transmit FOR.

3. The optical sensor of claim 1, wherein said first steering MEMS MMA comprises a single mirror and said second steering MEMS MMA includes a plurality of M mirrors, wherein said range of scan angles includes a specified angle in said first angular direction and a range of angles in said second angular direction, said controller is configured to (a) issue command signals to the first steering MEMS MMA to tip and tilt the single mirror to scan the optical transmit beam over the primary transmit FOR and to (b) issue command signals to the first steering MEMS MMA to set the tip and tilt of the single mirror at the specified angle in the first angular direction to re-direct the optical transmit beam off of the fold mirror and to scan the tip and tilt of the single mirror over the range of angles in the second angular direction to scan the optical transmit beam across the plurality of M mirrors in the second steering MEMS MMA and to issue command signals to the second steering MEMS MMA to tip and tilt the mirror on which the optical transmit beam is incident to scan the optical transmit beam over the secondary transmit FOR, wherein the scan of the single mirror in the first steering MEMS MMA in the second angular direction extends the secondary transmit FOR in the second angular directions.

4. The optical sensor of claim 3, wherein the plurality of M mirrors in the second steering MEMS MMA are arranged in a row, wherein the range of scan angles further spans a range of angles in the first angular direction, wherein the controller is configured in (b) to issue command signals to the first steering MEMS MMA to tip and tilt the single mirror to scan the optical transmit within the range of angles in the first angular direction to scan the optical transmit beam across the row of M mirrors.

5. The optical sensor of claim 1, wherein said first steering MEMS MMA comprises a plurality of N mirrors and said second steering MEMS MMA comprises a single mirror, said controller is configured to (a) issue command signals to the first steering MEMS MMA to selectively translate each of the N mirrors to shape the optical transmit beam and to tip and tilt the plurality of N mirrors to scan the shaped optical transmit beam over the primary FOR and to (b) issue command signals to the first steering MEMS MMA to selectively translate each of the N mirrors to shape the optical transmit beam and to set the tip and tilt of each of the N mirrors within the range of scan angles to re-direct the optical transmit beam off of the fold mirror to the single mirror of the second steering MEMS MMA, and to issue command signals to the second steering MEMS MMA to tip and tilt the single mirror to scan the shaped optical transmit beam over the secondary transmit FOR.

6. The optical sensor of claim 5, wherein the first steering MEMS MMA's N mirrors are selectively translated to shape the optical transmit beam to perform one or more of the following:
  adjust a size, divergence or intensity profile of the optical transmit beam;
  produce deviations in the wavefront of the optical transmit beam to compensate for atmospheric distortion;
  adjust the phase and maintain a zero phase difference across the wavefront of optical transmit beam; and
  given a maximum translation of each mirror, form a minimum number of continuous surfaces across the N mirrors at the specified tip and tilt to reduce distortion.

7. The optical sensor of claim 1, wherein said first and second steering MEMS MMAs include K×L mirrors and P×Q mirrors, respectively, K, L, P and Q are each integers greater than one.

8. The optical sensor of claim 7, wherein responsive to command signals said first steering MEMS MMAs is partitioned into a plurality of segments, each segment including a plurality of mirrors configured to tip and tilt to scan multiple optical transmit beams at different scan angles over the primary transmit FOR, wherein responsive to command signals said second steering MEMS MMAs is partitioned into a plurality of segments, each segment including a plurality of mirrors configured to tip and tilt to scan multiple optical transmit beams at different scan angles over the secondary transmit FOR.

9. The optical sensor of claim 8, wherein the mirrors in each segment reflect light at different wavelengths such that the multiple optical transmit beams comprise a plurality of different wavelengths.

10. The optical sensor of claim 7, wherein the groups of mirrors in the first and second steering MEMS MMA's are selectively translated to shape the optical transmit beam to perform one or more of the following:
  adjust a size, divergence or intensity profile of the optical transmit beam;
  produce deviations in the wavefront of the optical transmit beam to compensate for atmospheric distortion;
  adjust the phase and maintain a zero phase difference across the wavefront of optical transmit beam; and
  given a maximum translation of each mirror, form a minimum number of continuous surfaces across the N mirrors at the specified tip and tilt to reduce distortion.

11. The optical sensor of claim 1, wherein the fold mirror is configured to filter the optical transmit beam based on wavelength or electro-optical (EO) polarization such that the optical transmit beam that scans the secondary transmit FOR has a different spectral or polarization composition than the optical transmit beam that scans the primary transmit FOR.

12. The optical sensor of claim 1, wherein each said mirror in the first and second steering MEMS MMAs rotates about X and Y axes, respectively, in which the X and Y axes are orthogonal to each other, and translates in a Z axis orthogonal the XY plane to tip, tilt and translate, respectively.

13. The optical sensor of claim 12, wherein each said mirror is supported at three vertices of a triangle, wherein lines defined by three different pairs of said vertices provide three axes at 60 degrees to one another in the XY plane, wherein each said mirror pivots about each said axes to produce tilt, tip and piston in the XYZ space.

14. The optical sensor of claim 1, wherein said first and second steering MEMS MMAs are configured such that said primary and secondary transmit FOR are contiguous in either the first or second angular direction.

15. The optical sensor of claim 1, wherein the receive FOR includes at least a portion of one of the primary or secondary transmit FOR.

16. The optical sensor of claim 15, wherein one of the primary or secondary transmit FOR is used to perform an optical function other than imaging a portion of the scene.

17. The optical sensor of claim 1, wherein the range of scan angles is positioned at an edge of the primary transmit FOR in the first or second angular directions.

18. The optical sensor of claim 1, wherein the detector comprises one or more tiled staring detectors, wherein the optical system is fixed to form an image on the one or more tiled staring detectors.

19. An optical sensor, comprising:
a detector responsive to light in a band of wavelengths;
an optical source that emits an optical transmit beam along an optical axis at a transmission wavelength within the band;
a first steering Micro-Electro-Mechanical System (MEMS) Micro-Mirror Array (MMA) positioned at an angle to the optical axis to receive and re-direct the optical transmit beam along a first optical path at a first reflection angle, said first steering MEMS MMA comprising only a single mirror responsive to command signals to tip and tilt to scan the optical transmit beam at a scan angle in first and second angular directions about the first reflection angle over a primary transmit field-of-regard (FOR);
a fold mirror positioned to intercept the re-directed optical transmit beam at a range of scan angles within the primary transmit FOR and re-direct the optical transmit beam along a second optical path;
a second steering MEMS MMA positioned to receive and re-direct the optical transmit beam from the fold mirror along a third optical path at a second reflection angle and offset from the first optical path, said second steering MEMS MMA comprising only a single mirror responsive to command signals to tip and tilt to scan the optical transmit beam at a scan angle in said first and second directions about the second reflection angle over a secondary transmit FOR;
a controller configured to issue command signals to said first and second steering MEMS MMAs to scan the optical transmit beam over the primary and secondary transmit FOR;
a receive telescope that receives light within a receive FOR, and
an optical system that couples light from the receive telescope to the detector to image a portion of a scene within the receive FOR.

20. An optical beam steerer, comprising:
an optical source that emits an optical transmit beam along an optical axis;
a first steering Micro-Electro-Mechanical System (MEMS) Micro-Mirror Array (MMA) positioned at an angle to the optical axis to receive and re-direct the optical transmit beam along a first optical path at a first reflection angle, said first steering MEMS MMA comprising at least one mirror responsive to command signals to tip and tilt to scan the optical transmit beam at a scan angle in first and second angular directions about the first reflection angle over a primary transmit field-of-regard (FOR);
a fold mirror positioned to intercept the re-directed optical transmit beam at a range of scan angles within the primary transmit FOR and re-direct the optical transmit beam along a second optical path; and
a second steering MEMS MMA positioned to receive and re-direct the optical transmit beam from the fold mirror along a third optical path at a second reflection angle and offset from the first optical path, said second steering MEMS MMA comprising at least one mirror responsive to command signals to tip and tilt to scan the optical transmit beam at a scan angle in said first and second directions about the second reflection angle over a secondary transmit FOR.

21. The optical beam steerer of claim 20, wherein said first steering MEMS MMA comprises a single mirror and said second steering MEMS MMA includes a plurality of M mirrors, wherein said range of scan angles includes a specified angle in said first angular direction and a range of angles in said second angular direction, said controller is configured to (a) issue command signals to the first steering MEMS MMA to tip and tilt the single mirror to scan the optical transmit beam over the primary transmit FOR and to (b) issue command signals to the first steering MEMS MMA to set the tip and tilt of the single mirror at the specified angle in the first angular direction to re-direct the optical transmit beam off of the fold mirror and to scan the tip and tilt of the single mirror over the range of angles in the second angular direction to scan the optical transmit beam across the plurality of M mirrors in the second steering MEMS MMA and to issue command signals to the second steering MEMS MMA to tip and tilt the mirror on which the optical transmit beam is incident to scan the optical transmit beam over the secondary transmit FOR, wherein the scan of the single mirror in the first steering MEMS MMA in the second angular direction extends the secondary transmit FOR in the second angular directions.

22. The optical beam steerer of claim 20, wherein said first steering MEMS MMA comprises a plurality of N mirrors and said second steering MEMS MMA comprises a single mirror, said controller is configured to (a) issue command signals to the first steering MEMS MMA to selectively translate each of the N mirrors to shape the optical transmit beam and to tip and tilt the plurality of N mirrors to scan the shaped optical transmit beam over the primary FOR and to (b) issue command signals to the first steering MEMS MMA to selectively translate each of the N mirrors to shape the optical transmit beam and to set the tip and tilt of each of the N mirrors within the range of scan angles to re-direct the optical transmit beam off of the fold mirror to the single mirror of the second steering MEMS MMA, and to issue command signals to the second steering MEMS MMA to tip and tilt the single mirror to scan the shaped optical transmit beam over the secondary transmit FOR.

* * * * *

UNITED STATES PATENT AND TRADEMARK OFFICE
CERTIFICATE OF CORRECTION

Page 1 of 1

PATENT NO. : 11,835,709 B2
APPLICATION NO. : 17/171577
DATED : December 5, 2023
INVENTOR(S) : Uyeno et al.

It is certified that error appears in the above-identified patent and that said Letters Patent is hereby corrected as shown below:

In the Specification

In Column 7, Line 17, delete "54" and insert --52-- therefor

In Column 9, Line 6, delete "bean" and insert --beam-- therefor

In Column 9, Line 24, delete "900" and insert --90°-- therefor

In Column 9, Line 27, delete "bean" and insert --beam-- therefor

In the Claims

In Column 15, Line 34, in Claim 19, delete "FOR," and insert --FOR;-- therefor

Signed and Sealed this
Fourth Day of February, 2025

Coke Morgan Stewart
*Acting Director of the United States Patent and Trademark Office*